UNITED STATES PATENT OFFICE.

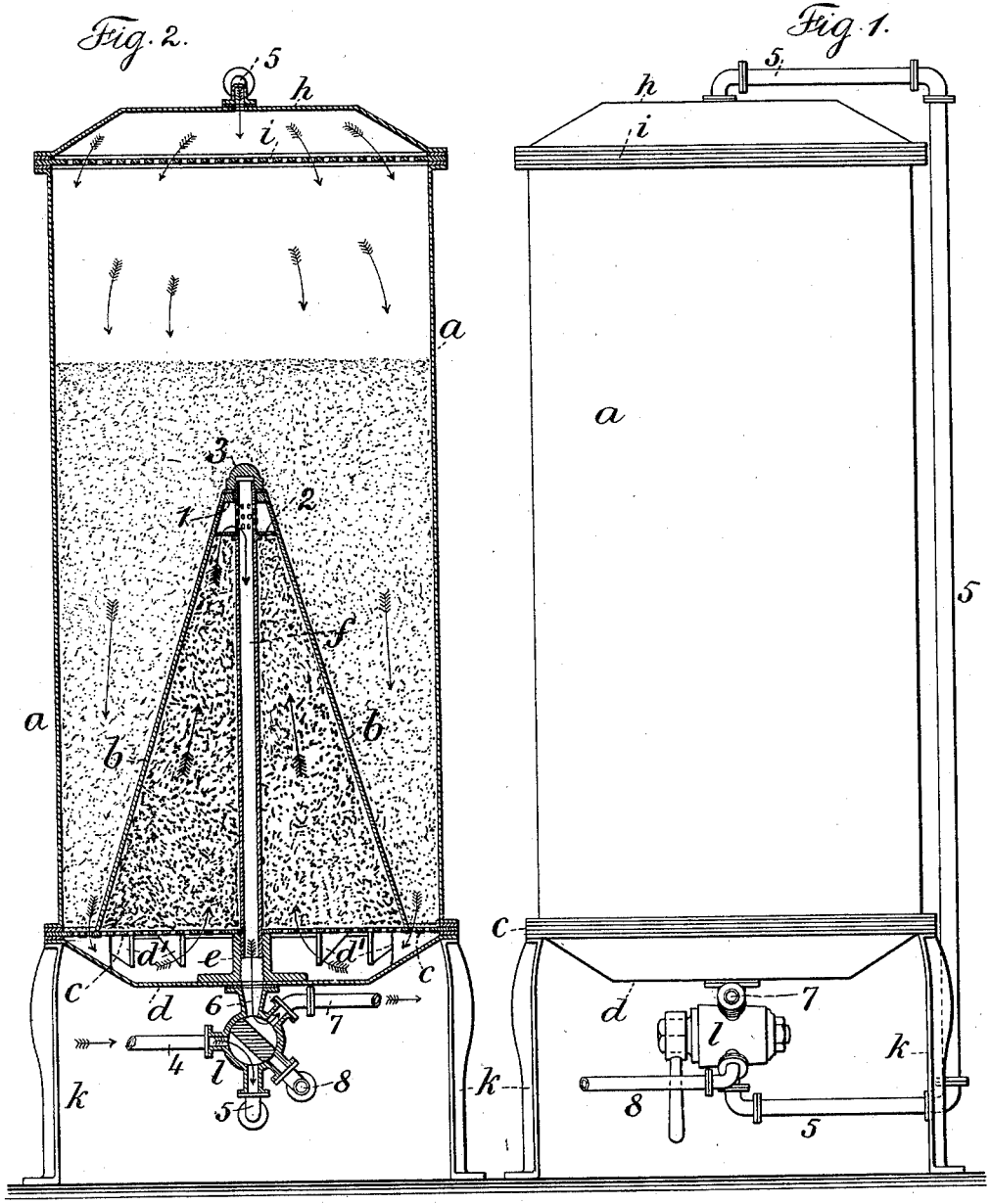

WILLIAM T. MOFFITT, OF NEW BRIGHTON, NEW YORK.

FILTER.

SPECIFICATION forming part of Letters Patent No. 592,525, dated October 26, 1897.

Application filed November 27, 1896. Serial No. 613,484. (No model.)

*To all whom it may concern:*

Be it known that I, WILLIAM T. MOFFITT, a citizen of Great Britain, residing at New Brighton, in the county of Richmond and State of New York, have invented a new and useful Improvement in Filters, of which the following is a specification.

My invention relates to the novel arrangement and combination of parts hereinafter set forth in which the operation is in one direction for filtering the water and in the reverse direction for cleaning the filter.

In carrying out my invention the water to be filtered is passed through mediums of different character, and with each filtering medium the density is increased in the direction of the flow of the water. I employ a cylindrical vessel having top and bottom heads, and within it are top and bottom perforated plates and an internal cone having a central pipe, and sand is employed outside of the internal cone and within the cylindrical vessel and charcoal of similar material inside the internal cone and around the central pipe. In connection with these parts I employ a five-way cock which, together with connected pipes, permits the flow of water down through the cylindrical vessel and up through the internal cone and down the central pipe and away to be used, and in the other position of the five-way cock the water passes in the reverse direction to loosen up and clean out the charcoal and the sand, the water therefrom being discharged into a sewer or in any other convenient manner.

In the drawings, Figure 1 is an elevation representing my improvement. Fig. 2 is a vertical section of the same, showing the five-way cock in one position; and Fig. 3 is a section showing the five-way cock in the other position.

The cylindrical vessel is represented at $a$ and the internal cone at $b$. The cylindrical vessel is provided with a bottom head $d$ and top head $h$, and at the point of union of the bottom and top heads with the cylindrical vessel there are perforated plates $c$ and $i$, that extend across the vessel, and there are packing-rings between the cylindrical vessel and top and bottom heads, the parts being bolted or riveted together in any desired manner, and legs $k$ support the filter. The concave bottom head $d$ is provided with short radial ribs $d'$, that extend inward from the peripheral flange, and the perforated plate $c$ is partially supported by these ribs, the internal cone $b$ resting upon the perforated plate $c$ above said ribs $d'$.

The upper and small end of the cone $b$ is provided with a ring 1, and a short distance from this small end there is a perforated plate 2, and the central pipe $f$ is screw-threaded at its extreme end and perforated adjacent thereto and provided with a collar, and said pipe passes through the perforated plate 2 and its collar bears upon said plate, the screw-threaded end of said pipe projecting beyond the small end of the cone to receive the screw-cap 3, which covers the end of the pipe and securely holds the same in place within the cone. The lower end of the pipe $f$ passes through the perforated plate $c$ and is threaded and passes into a sleeve $e$, located between the bottom head $d$ and the perforated plate $c$, said sleeve forming a connection with said pipe $f$ and acting as a support for the center of the perforated plate $c$.

The five-way cock is represented at $l$, and connected thereto are the pipes 4, 5, 6, 7, and 8, the pipe 6 being connected to the under side of the bottom head $d$ and in line with the central pipe $f$, passing up into the filter, and the pipe 5 extends out beyond the wall of the filter and rises to the top of the filter and has a branch extending to the center of the filter, joining with the top head $h$, and said pipe opens into the top of the filter. The pipe 4 is for the water-supply, the pipe 7 for the water-discharge, and the pipe 8 connects with the sewer or is adapted to lead away to any desired place the refuse water from washing out the filter. Sand is placed within the cylindrical vessel $a$ and outside the internal cone $b$, and charcoal is inclosed within the internal cone $b$ and between the perforated plates $c$ and 2.

The operation of the filter is substantially as follows: Water enters by the supply-pipe 4, passes through the five-way cock into the pipe 5, as shown in Fig. 2, rises through the pipe 5, and enters the top of the filter, passing through the perforated plate $i$ and down through the sand in the cylindrical vessel, which sand, because of the internal cone, is packed tightest at the lower end of the cylindrical vessel. The water passes down through the sand, through the perforated plate c, into the space between said perforated plate and the bottom head d. It rises through the plate c and passes up through the charcoal inside the cone b through the perforated plate 2 and the perforations in the upper end of the pipe f, down through the pipe f and sleeve e into and through the five-way cock l, and away for use by the pipe 7.

When it is desired to clean out the filter, the five-way cock is turned by its handle into the position shown in Fig. 3. The water then passes in the reverse direction from the pipe 4 through the five-way cock, up the sleeve e and central pipes e f, down through the charcoal in the internal cone, loosening the same and washing out the refuse material through the perforated plate c, upward through said plate c, outside of the internal cone, and up through the sand, loosening the same and washing out the refuse material, and as the water rises in the cylindrical vessel it passes out and down through the pipe 5, through the five-way cock, and away through the pipe 8, as will be seen from the position of the parts in Fig. 3.

My invention comprises a simple, inexpensive, and efficient means for filtering water and for cleaning the filter of the refuse and deposited material.

I claim as my invention—

1. In a filter, the combination with a cylindrical vessel having top and bottom heads and receiving sand or similar material, of a perforated plate across the vessel above the bottom head, an internal cone rising from and above said perforated plate and inclosing the major portion of its surface and receiving charcoal or similar material and having a perforated plate 2 near its apex, a central pipe within the cone having perforations at its upper end and passing through the perforated plates, a pipe extending to the top of the vessel and a cock connected with the said pipes for admitting water to be filtered into the upper end of the vessel to flow down through the vessel and up within the cone through the perforations of the plates, and down through the central pipe, or in the reverse direction for cleaning out the filter, substantially as set forth.

2. In a filter, the combination with the cylindrical vessel having top and bottom heads, of the perforated plates c and i at the opposite ends of said vessel, a cone b within said vessel resting upon the lower perforated plate c, a central pipe f perforated at its upper end and connected to the small end of the cone, a sleeve between the bottom head and the perforated plate c receiving the central pipe and a five-way cock connected to the bottom head and having one of its pipes connecting with the central pipe and pipes connected with said five-way cock for supplying the water to the top of the cylindrical vessel to pass down through the sand or similar material therein, and up within the cone b and through the charcoal or similar material therein and down through the central pipe f for use, or in the reverse direction for loosening the material and cleaning out the refuse from the filter, substantially as set forth.

3. In a filter, the combination with the cylindrical vessel a having a head h and a perforated plate i, of the concave bottom head d having radial ribs d' adjacent to the peripheral flange of the plate, the perforated plate c resting upon said ribs, the internal cone b over and upon said perforated plate c and the ribs d', the central pipe f perforated and threaded near its upper end, the perforated plate 2 of the cone through which said pipe passes and a screw-cap 3 outside of the small end of the cone and upon and closing the end of the pipe f, the sleeve e between the bottom head and the perforated plate c receiving the lower end of the pipe f, and means, substantially as shown and described, for directing the water through the filtering material in one direction to be filtered, or in the reverse direction to loosen up the filtering material and clean out the filter, substantially as set forth.

Signed by me this 19th day of November, A. D. 1896.

W. T. MOFFITT.

Witnesses:
HAROLD SERRELL,
E. E. POHLÉ.